(12) United States Patent
Volz

(10) Patent No.: US 10,469,311 B2
(45) Date of Patent: Nov. 5, 2019

(54) HANDLING NETWORK FAILURES IN NETWORKS WITH REDUNDANT SERVERS

(71) Applicant: Cisco Technology, Inc., San Jose, CA (US)

(72) Inventor: Bernard Ernst Volz, Center Harbor, NH (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 15/648,837

(22) Filed: Jul. 13, 2017

(65) Prior Publication Data
US 2019/0020534 A1 Jan. 17, 2019

(51) Int. Cl.
H04L 12/24 (2006.01)
H04L 29/08 (2006.01)
H04L 12/26 (2006.01)

(52) U.S. Cl.
CPC ........ H04L 41/0672 (2013.01); H04L 41/046 (2013.01); H04L 41/0806 (2013.01); H04L 43/10 (2013.01); H04L 43/16 (2013.01); H04L 67/1034 (2013.01); H04L 67/16 (2013.01); H04L 41/0213 (2013.01); H04L 43/0823 (2013.01)

(58) Field of Classification Search
CPC . H04L 61/2015; H04L 63/08; H04L 61/6022; H04L 63/0281; H04L 29/06; H04L 61/2007; H04L 61/2061; H04L 69/329; H04L 12/2856; H04L 61/00; H04L 61/6059; H04L 63/029; H04L 63/06; H04L 63/061; H04L 63/10; H04L 67/28; H04L 12/43; H04L 12/6418; H04L 2012/6459; H04L 2012/6472; H04L 2012/6481; H04L 29/06027; H04L 29/12009; H04L 61/2053; H04L 67/16
See application file for complete search history.

(56) References Cited

U.S. PATENT DOCUMENTS 5,938,732 A 8/1999 Lim et al.
7,769,021 B1 8/2010 Chen et al.
(Continued)

OTHER PUBLICATIONS

T. Mrugalski, et al., "DHCPv6 Failover Protocol", draft-ietf-dhc-dhcpv6-failover-protocol-06, Dynamic Host Configuration (DHC), Internet-Draft, Feb. 27, 2017, 94 pages.
(Continued)

Primary Examiner — Djenane M Bayard
(74) Attorney, Agent, or Firm — Edell, Shapiro & Finnan, LLC

(57) ABSTRACT

A method for providing services by a pair of servers to clients through one or more relay agents. The pair includes a second server configured to respond to discovery messages, and a first server configured to be unresponsive to the discovery messages. The method includes: at the first server, receiving a first discovery message from a first relay agent at a first time; and configuring the first server to become responsive to the first discovery message when a number of discovery messages from the first relay agent is equal to or greater than a predetermined number threshold and when a time lapse between the first time and a second time is equal to or greater than a predetermined time threshold. The count and time period are reset if the second server is determined to be responsive to discovery messages by monitoring the client request messages.

20 Claims, 9 Drawing Sheets

(56) References Cited

U.S. PATENT DOCUMENTS

| | | |
|---|---|---|
| 8,291,111 B1 | 10/2012 | Kinnear, Jr. et al. |
| 8,737,232 B2 | 5/2014 | Chen et al. |
| 8,738,765 B2 | 5/2014 | Wyatt et al. |
| 9,077,611 B2 | 7/2015 | Cordray et al. |
| 2005/0086342 A1 | 4/2005 | Burt et al. |
| 2008/0317011 A1 | 12/2008 | Datta et al. |
| 2010/0162036 A1 | 6/2010 | Linden et al. |

OTHER PUBLICATIONS

Ralph Droms, et al., "DHCP Failover Protocol", draft-ietf-dhc-failover-12.txt, Mar. 2003, Network Working Group, Internet Draft, pp. 1-75.

Ralph Droms, et al., "DHCP Failover Protocol", draft-ietf-dhc-failover-12.txt, Mar. 2003, Network Working Group, Internet Draft, pp. 76-133.

B. Volz, et al., "DHC Load Balancing Algorithm", Network Working Group, Feb. 2001, RFC 3074, 10 pages.

| REPLAY AGENT | ENTRY 404 | |
|---|---|---|
| 1 | ADDRESS | XXX.XXX.XX.X |
| | PartnerUnresponsiveStartTime | 15:20:26 |
| | PartnerDiscoveryCount | 1 |
| | PartnerLastDiscoveryTime | 15:20:40 |
| | RespondForPartner | FALSE |
| 2 | ADDRESS | YYY.YYY.YY.Y |
| | PartnerUnresponsiveStartTime | 3:05:40 |
| | PartnerDiscoveryCount | 2 |
| | PartnerLastDiscoveryTime | 3:06:02 |
| | RespondForPartner | FALSE |

HANDLING NETWORK FAILURES IN NETWORKS WITH REDUNDANT SERVERS

TECHNICAL FIELD

The present disclosure relates to handling network failures.

BACKGROUND

In a failover system, there are two servers configured to operate in a failover relationship. One of the servers is configured to be the main server that responds to service requests, while the other serves as the backup server and is configured to be unresponsive to service requests. When the main server becomes unresponsive to service requests, the backup server may step in and become responsive to service requests. Thus, when the servers are both operational (failover is in a "normal" mode), only one of the servers is responsive to requests not explicitly addressed to a server. Furthermore, relay agents may be provided in the network to relay communication packets from clients to both servers. The communication path from a relay agent to each server may be different, and is likely also different for the communication path between the failover servers/partners. When communication fails between the relay agent and one of the servers but communication remains operational between the relay agent and the other server, services provided to clients may be impaired if the server to which communication has failed was the responsive/main server in the failover pair.

DESCRIPTION OF EXAMPLE EMBODIMENTS

Overview

Figure 1:
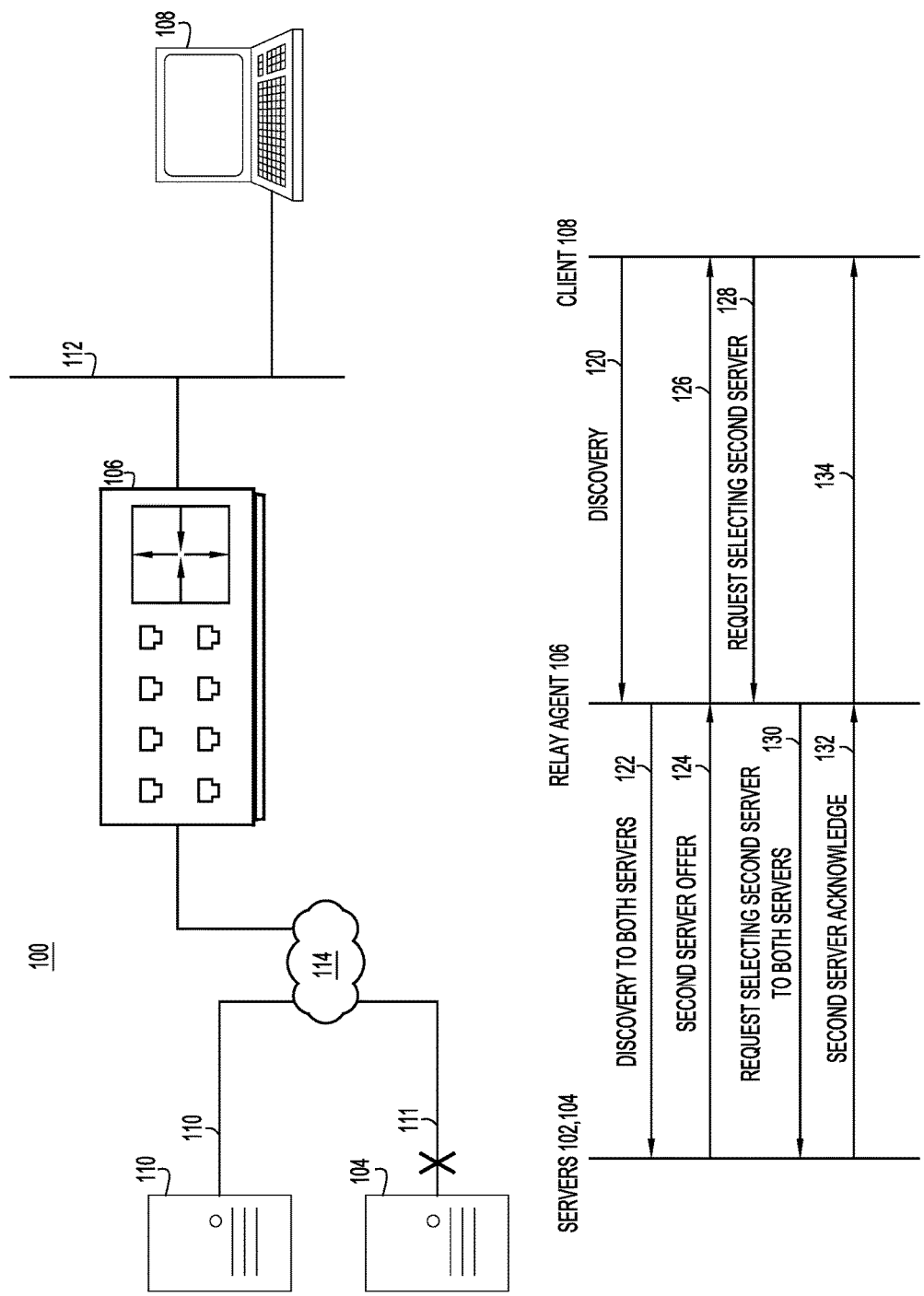
FIG. 1 depicts a communication system and related communications in the network in which a failover server pair is present and configured to operate in accordance with the techniques presented herein, according to an example embodiment.

In one embodiment, services are provided by a pair of servers to a plurality of client devices (clients) through one or more relay devices/agents. The pair of servers includes a main server and a backup server. The main server is configured to respond to discovery messages. The backup server is configured to be unresponsive to the discovery messages and to be responsive to the discovery messages when the main server becomes unresponsive. The one or more relay agents are configured to relay messages communicated between the plurality of clients and the pair of servers. The backup server may receive a first discovery message from a first relay agent at a first time. The first discovery message has originated from a client for both the main server and the backup server. The backup server is configured to determine whether a number of discovery messages received from the first relay agent is equal to or greater than a predetermined number threshold, and to determine whether a time lapse between the first time and a second time is equal to or greater than a predetermined time threshold. The second time is a time when the backup server receives a discovery message that causes the count of discovery messages to go from 0 to 1. When the number of discovery messages from the first relay agent is equal to or greater than the predetermined number threshold and when the time lapse between the first time and the second time is equal to or greater than the predetermined time threshold, the backup server is configured to become responsive to the first discovery message received via that relay agent.

Example Embodiments

Presented herein are devices, systems, and methods for handling network failures and improving services to client devices. Generally, to provide a steady, reliable service to clients, a plurality of servers may be employed in a communication network in case one of the servers is unresponsive due to breakdown, maintenance, rebooting, or network failures. For example, in a Dynamic Host Configuration Protocol (DHCP) system, a pair of failover servers/partners may be provided, in which one of the servers of the failover pair is configured to be a main server and the other server is configured to be a backup server. The main server is responsive to a DHCP discover (DHCPv4)/solicit (DHCPv6) message/packet (or in general any service request message), while the backup server remains unresponsive until it detects that the main server is down or is not responding to discover/solicit (discovery) requests. In a "normal" communication mode, both failover servers are functioning and can determine the status of each other by "heart beat" messages sent between them. Upon detecting that a partner server is not functioning, a failover partner can step in and take over the responsibility to respond to service requests from clients. In a DHCP system, generally one or more relay agents may be employed to relay messages communicated between the servers and clients. A relay agent needs to relay a discovery message from a client to both failover servers. While both servers receive the discovery message, only the main server responds to the discovery message.

In some embodiments, a backup server may take over the responsibility to provide services to clients when the backup server detects that the main server is functioning but unresponsive to discovery messages due to, for example, a network failure for communications between the main server and the relay agent.

Reference is now made to FIG. 1 for a detailed description of the above-described system and related methods. FIG. 1 depicts a DHCP system 100 according to an example embodiment. The DHCP system 100 includes a first server 102, a second server 104, a relay agent 106, and a client 108. Although one relay agent and one client are depicted in FIG. 1, the DHCP system 100 may include more relay agents and clients. Further, more than two servers may be included in the DHCP system 100. In an example, relay agents may include routers, cable modem termination systems (CMTS), or other intermediate devices that can relay communication messages between servers and clients. A client is a client device, such as a cable modem, a mobile phone, a tablet, a laptop computer, a desktop computer, or any other electronic device that can be used by a user to connect to a network. Moreover, the client may be a software process running on a dedicated device or in a cloud/data center computing environment. The servers 102 and 104 are coupled to a first network 110 and a second network 111, respectively, while the relay agent 106 is coupled to the client 108 through a third network 112. In one embodiment, the first network 110, the second network 111, and the third network 112 may be local area networks. Further, the relay agent 106 is coupled to the first network 110 and the second network 111 through one or more wired or wireless networks 114. In one embodiment, the network 114 may be a wide area network (WAN), e.g., the Internet. In one embodiment, the first server 102 is a backup server of a failover pair and the second server 104 is a main server of the failover pair, meaning that when a discovery message is transmitted to both the first server 102 and the second server 104, only the second server 104 is configured to respond.

The lower portion of FIG. 1 depicts how a DHCP service is requested and provided. Although DHCP is illustrated throughout this disclosure, the techniques disclosed herein may be applied to other protocols and are not limited to DHCP. At 120, the client 108 boots up and transmits a discovery message/packet to the relay agent 106 through the third network 112. The discovery message is for both servers or all servers in the system 100. In DHCPv4, the discovery message is called "Discover" or "DHCPDISCOVER." In DHCPv6, the discovery message is called "Solicit." A DHCP client generally does not know where a relay agent or server may be so that the DHCP client may not use the traditional end-to-end communication. Instead, a client broadcasts (DHCPv4) or multicasts (DHCPv6) its discovery/solicit messages. Either a server or relay agent that receives these messages takes certain actions.

At 122, the relay agent 106 relays the discovery message to both the first server 102 and the second server 104. In some embodiments, after receiving the discovery message, the relay agent 106 may modify the discovery message and forward the modified discovery message to the servers. For example, the relay agent 106 may add additional information to the message (DHCPv4) or encapsulate the discovery message into another message (DHCPv6). In a further embodiment, the relay agent 106 sets the giaddr (GIADDR) field in a DHCPv4 discovery message to an address of an interface on which the relay agent 106 received the discovery message and may also add optional information to provide a receiving server some additional information. When receiving a DHCPv6 discovery message (Solicit), the relay agent 106 creates a new Relay-Forward message which has a link-address field to specify an address of an interface on which the client 108 is located, and a Relay-Message option which contains the client's discovery message.

The discovery message or modified discovery message is then received at both servers 102 and 104. Because the second server 104 is the main server, the second server 104 is configured to respond to the discovery message while the first (backup) server 102 remains unresponsive. At 124, the second server 104 transmits an offer message to the relay agent 106. The offer message is termed "Offer or DHCPOFFER" in DHCPv4 and "Advertise" in DHCPv6. In one example, the second server 104 sends the offer message to the relay agent 106 at the address indicated by the giaddr field in the received discovery message. In another example, the server sends the offer message to the relay agent 106 to the IPv6 source address of the received Relay-Forward message.

At 126, the relay agent 106 relays the offer message to the client 108. For example, the relay agent 106 removes any added optional information in the DHCPv4 message and then sends the offer message to the client 108. For DHCPv6, the relay agent 106 receives a Relay-Reply message and extracts the Relay-Message option which contains the message to be sent to the client 108. The offer message includes a server identification of the second server 104 to indicate which server provides the offer message.

At 128, upon receiving the offer message, the client 108 is configured to transmit a request message to the relay agent 106. The request message includes the client's request for services and an indication of a selection of servicing server, i.e., the second server 104 in this example. In one embodiment, the indication may be in a form of the server identification of the second server 104 included in the offer message received at 126. In some embodiments, the request message may be a "DHCPREQUEST" in DHCPv4 or a "Request" in DHCPv6.

At 130, the relay agent 106 relays the request message to both servers 102 and 104. In forwarding the request message to the servers 102 and 104, the relay agent 106 may perform modification on the request message as described at 122.

The servers 102 and 104 receive the request message. Each of the servers 102 and 104 may extract the server identification included in the request message and compare that with its own server identification. Then the server (here the second/main server 104) that determines the comparison resulting in a match will respond to the request message. At 132, the second server 104 transmits an acknowledge message, e.g., "DHCPACK" in DHCPv4 or a "Reply" in DHCPv6, to the relay agent 106, which at 134 relays the acknowledge message to the client 108. The first server does not transmit an acknowledge message because the extracted server identification does not match its server identification.

Referring to the upper portion of FIG. 1, the first/backup server 102 is connected to the network 114 through a first network 110 and the second/main server 104 is connected to the network 114 through a second network 111. The second network 111 may go down due to, for example, a network failure. Although the main server 104 is still operational, it cannot receive the discovery messages relayed from the relay agent 106 and thus cannot return the offer message to the relay agent 106. In the meantime, the backup server 102 continues to receive discovery messages but does not receive a request message selecting the main server 104. When this happens, the backup server 102 may step in and take over the responsibility to respond to the discovery messages for the main server 104 as will be explained in further detail hereafter.

Figure 2:
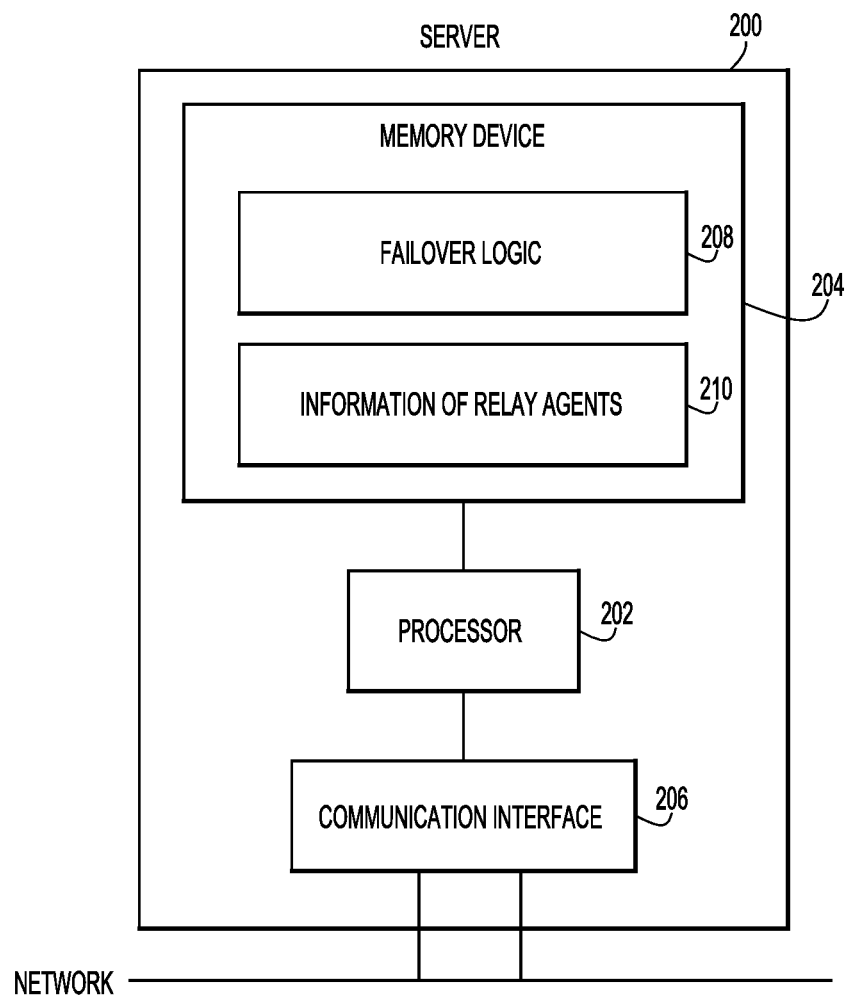
FIG. 2 depicts a block diagram of a server of a failover server pair that is configured to operate in accordance with the techniques presented herein, according to an example embodiment.

FIG. 2 is a block diagram depicting a server 200 configured to operate according to an example embodiment. The server 200 shown in FIG. 2 is representative of the first server 102 and the second server 104 shown in FIG. 1. The server 200 includes a processor 202, a memory 204, and a communication interface 206. The processor 202 may be a microprocessor or microcontroller (or multiple instances of such components) that is configured to execute program logic instructions (i.e., software) for carrying out various operations and tasks described herein. For example, the processor 202 is configured to execute instructions for failover logic 208 stored in the memory 204 to take over the responsibility of providing service to clients when its failover partner becomes unresponsive to discovery messages. Further descriptions of the operations performed by the processor 202 when executing instructions stored in the memory 204 are provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data, such as information of relay agents 210, used for the operations described herein and stores software or processor executable instructions that are executed to carry out the operations described herein.

The failover logic 208 may take any of a variety of forms, so as to be encoded in one or more tangible/non-transitory computer readable memory media or storage device for execution, such as fixed logic or programmable logic (e.g., software/computer instructions executed by a processor), and the processor 202 may be an application specific integrated circuit (ASIC) that comprises fixed digital logic, or a combination thereof For example, the processor 202 may be embodied by digital logic gates in a fixed or programmable digital logic integrated circuit, which digital logic gates are configured to perform the failover logic 208. In general, the failover logic 208 may be embodied in one or more computer-readable storage media encoded with software comprising computer executable instructions and when the software is executed operable to perform the operations described herein.

The communication interface 206 is configured to transmit signals to or receive signals from a network for the server 200. In one example, the communication interface 206 may take the form of one or more network interface cards. For example, the communication interface 206 may receive discovery messages or request messages from a relay agent or a client. Further, the communication interface 206 may transmit offer messages or acknowledge messages to a relay agent or a client or communicate "heart beat" messages and other data to the failover partner.

Figure 3:
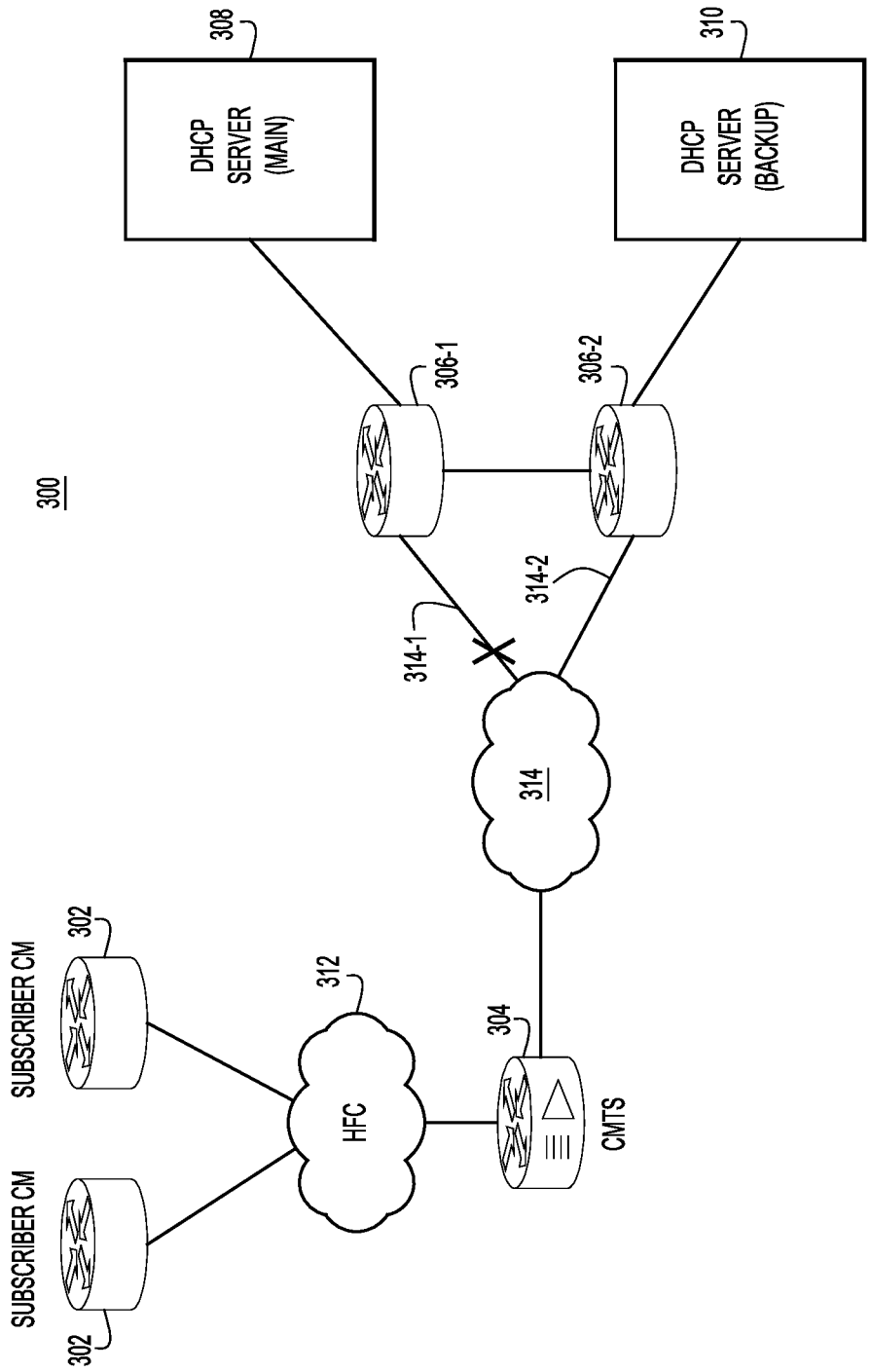
FIG. 3 depicts a communication system to which the techniques for handling network failures may be employed, according to an example embodiment.

FIG. 3 depicts a system 300 to which techniques for handling network failures may be employed, according to an example embodiment. The system 300 includes a plurality of clients 302 (e.g., subscriber cable modems (CM)), a relay agent 304 (e.g., a CMTS), a first router 306-1, a second router 306-2, a main server 308 (e.g., DHCP main server), and a backup server 310 (e.g., DHCP backup server). The clients 302 are coupled to the relay agent 304 through a broadband network 312, such as a Hybrid Fiber Coaxial (HFC) network. The relay agent 304 communicates with the main server 308 via the first router 306-1 over a WAN 314 and a first network link 314-1 and with the backup server 310 via the second router 306-2 over the WAN 314 and a second network link 314-2. In a non-limiting embodiment, the components of system 300 operate in accordance with the Data Over Cable Service Interface Specification (DOCSIS).

In system 300, the relay agent 304 routes packets/messages communicated between the clients 302 and the servers 308 and 310 in a manner similar to the relay agent 106 depicted in FIG. 1. The main server 308 and the backup server 310 may execute their respective failover logic to communicate with each other, so that the pair of failover servers/partners is in the "normal" communication mode. In this mode, generally, the main server 308 is responsive to discovery message and the backup server 310 is not responsive to discovery messages. New clients will obtain leases from the main server 308 and existing clients will renew leases with the main server 308, but not the backup server 310. The backup server 310 may take over the responsibility of providing services to a client when the backup server 310 detects that the main server 308 is not functioning, such as after failing to receive "heart beat" messages within a time period.

In one embodiment, the first network link 314-1 between the relay agent 304 and the main server 308 may go down (for any of a variety of reasons), while the main server 308 and the backup server 310 can still communicate with each other via the first router 306-1 and the second router 306-2, i.e., they are in the normal communication mode. That is, the backup server 310 knows that the main server 308 is still up and running. If this happens, the backup server 310 may receive multiple discovery messages (e.g., DHCPDISCOVER or SOLICIT) from the relay agent 304 and will not respond to them because the main server is still functioning normally. However the backup server 310 will not receive any request messages (e.g., DHCPREQUEST or REQUEST) from the relay agent 304 because the offer message from the main server 308 is not transmitted to the relay agent 304 due to the network failure on the first network link 314-1. As a result, the client 302 cannot receive any offer message that is sent by a server in response to the discovery messages. The client 302, thus, cannot transmits its request for service message to the servers through the relay agent 304. In some embodiments, when the backup server 310 receives multiple discovery messages from the relay agent 304 but does not receive any request messages from the relay agent 304, the backup server 310 can become responsive to the discovery messages as will be further described hereafter.

Figure 4:
FIG. 4 shows example information/data related to relay agents stored by a server in a failover server pair, according to an example embodiment.

In one embodiment, each of the failover servers may maintain information/data related to relay agents coupled to the server and use the information, if it is a backup server, in determining whether to become responsive to discovery messages. For example, each failover server may save information related to the relay agents with which it communicates. The information may be stored in a memory, e.g., memory 204 in FIG. 2. FIG. 4 shows example information/data 400 related to relay agents stored by a failover server, according to an example embodiment. The information 400 includes an identification 402 of each relay agent and a corresponding entry 404 for the relay agent. Each entry 404 in the information 400 may include, for example:

An address (Address) of the relay agent. For example, for DHCPv4, this is the giaddr; for DHCPv6 this is the IPv6 source address of the relayed packet. The relay agent's address may be employed as an index into the information to locate entries. An alternate address for DHCPv6 is to use a Relay Agent Identifier option or other information in the Relay-Forward Message.

A count (PartnerDiscoveryCount) of the number of discovery messages received from the relay agent to which the other server should have responded. This value is initially set to zero, and incremented by one whenever a discovery message (e.g., DHCPDISCOVER or Solicit) is received to which this server does not respond. This value is set to zero whenever a request message (e.g., DHCPREQUEST or Request) is received from the relay agent (specified by Address), which does not select this server.

A time (PartnerUnresponsiveStartTime) at which the server receives from the relay agent a discovery message that causes the PartnerDiscoveryCount to go from 0 to 1. This starts the measurement time period to determine if the partner is being unresponsive.

A time (PartnerLastDiscoveryTime) at which the PartnerDiscoveryCount was last updated. This value is initially set to zero.

Whether the server should be responsive for its partner or not (RespondForPartner). This value may be TRUE or FALSE, and initially set to FALSE for a backup server or for both servers if each the pair of servers acts a backup server for the other. It can be set to TRUE when the partner's communication with the client seems to be impacted and this server should be responsive to client requests that it would not normally be responsive. As used herein, FALSE means that the server is not responsive to the discovery messages when its failover partner is in "normal" state. Conversely, TRUE means that the server is responsive to the discovery message.

The above information may be an in-memory table, but not persisted to a database. It is to be understood that additional data may be recorded, such as activity tracking, logging, or event notifications.

Further, each server includes at least three configurable parameters/threshold values used according to the techniques presented herein:

OTHER_SERVER_UNRESPONSIVE_TIME. This specifies a predetermined period of time the other server appears to have been unresponsive before this server can be configured to become responsive to clients. In a non-limiting embodiment, a default value of this may be 60 seconds.

OTHER_SERVER_REQUEST_COUNT. This specifies the minimum number of requests the other server has failed to respond to before this server can potentially become responsive to clients. In a non-limiting embodiment, a default value of this may be 10.

RESTART_TIME. This specifies a period of time of inactivity to restart the analysis window. Entries in the information where the PartnerLastDiscoveryTime is older than this value can be deleted or reset. In a non-limiting embodiment, a default value of this may be 30 seconds. For very low traffic conditions, this value may prevent a server from taking over for its unresponsive failover partner. Therefore, this value should be configured in light of the setting for the OTHER_SERVER_REQUEST_COUNT value.

These three parameters are used to compare against the information 400 the server stored related to the relay agents before a backup server can become responsive to client requests it otherwise would not have responded to. When a backup server in a failover relationship receives a message from a relay agent, the backup server determines whether the message is a discovery message (e.g., DHCPDISCOVER or SOLICIT). If the message is not a discovery message, the backup server terminates processing of the message for purpose of acting as a failover partner for the main server when the main server should have responded. If the message is a discovery message, the backup server extracts from the message an address of the relay agent and looks up the information 400 to determine whether the address of the relay agent is logged in the information 400. If the address of the relay agent is not logged in the information 400, the backup server generates an entry in the information 400 for the address of the relay agent.

If the address of the relay agent is logged in the information 400, the backup server locates the entry for the relay agent and determines whether it should respond to the discovery message by checking the setting in RespondForPartner. If the value in RespondForPartner is TRUE, the backup server responds to the discovery message. If the value in RespondForPartner is FALSE, the backup server determines whether a time lapse (time difference) between its PartnerLastDiscoveryTime and the current time is equal to or greater than the RESTART_TIME. If the time lapse is equal to or greater than the RESTART_TIME, the backup server resets PartnerDiscoveryCount to zero and sets RespondForPartner to FALSE, i.e., the backup server remains unresponsive to the received discovery message. When the time lapse is equal to or greater than the RESTART_TIME, it can be determined that an inactivity condition may have occurred in the system such that the backup server should not take over the main server's responsibility.

If the time lapse is less than the RESTART_TIME, the backup server increments PartnerDiscoveryCount by one and records the current time in the PartnerLastDiscoveryTime, i.e., the current time is used to replace the time recorded when the backup server received an immediately prior discovery message from the relay agent. Further, if the PartnerDiscoveryCount is now one, the current time is recorded in PartnerUnresponsiveStartTime. The backup further determines whether the PartnerDiscoveryCount is equal to or greater than the OTHER_SERVER_REQUEST_COUNT and whether a time lapse between the current time and the PartnerUnresponsiveStartTime is equal to or greater than the OTHER_SERVER_UNRESPONSIVE_TIME. If both determinations are positive, i.e., PartnerDiscoveryCount≥OTHER_SERVER_REQUEST_COUNT and current time minus PartnerUnresponsiveStartTime≥OTHER_SERVER_UNRESPONSIVE_TIME, the backup server checks if the RespondForPartner is set to FALSE. If so, the backup server sets the RespondForPartner to TRUE and becomes responsive to the discovery message.

In some embodiments, the backup server may receive a request for service message selecting the main server from the relay agent or a different relay agent. If this happens, the main server is responsive to discovery messages such that a client sends a request message that includes the main server's identification. After receiving the request message selecting the main server, the backup server determines whether an address of the relay agent that forwards the request message is logged in the information 400. If the address of the relay agent is not logged in the information 400, the backup server generates an entry for the relay agent. If the address of the relay agent is logged in the information 400, the backup server sets PartnerDiscoveryCount to zero and sets RespondForPartner to FALSE, which configures the backup server to become unresponsive to discovery messages. The PartnerUnresponsiveStartTime and PartnerLastDiscoveryTime in the entry for this relay agent remain unchanged.

In some embodiments, when a connection between the main server and the backup server in the failover relationship is discontinued or re-established, each of the main server and backup server resets all entries in their respective information 400. In a non-limiting example, the servers are configured to provide DHCP services to a plurality of clients.

Figure 5:
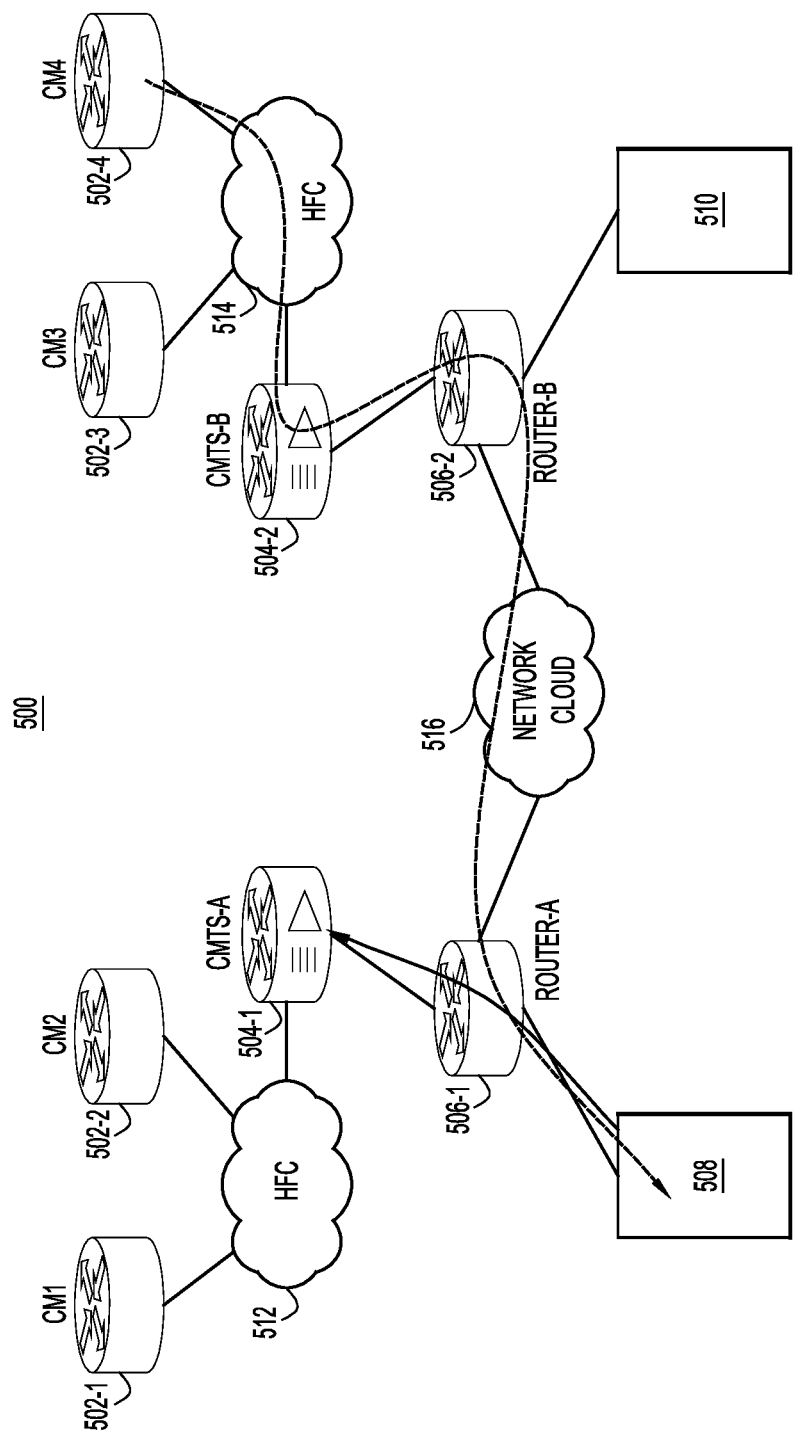
FIG. 5 depicts another communication system to which the techniques for handling network failures may be employed, according to an example embodiment.

FIG. 5 depicts another system 500 to which techniques for handling network failures disclosed herein may be applied, according to an example embodiment. The system 500 includes a plurality of clients 502 (denoted as CM1, CM2, CM3, and CM4), a plurality of relay agents 504 (denoted as CTMS-A and CMTS-B), a first router 506-1 (denoted as Router-A), a second router 506-2 (denoted as Router-B), a main server 508, and a backup server 510. The clients 502-1 and 502-2 are coupled to the first relay agent 504-1 through a first broadband network 512, such as an HFC network. The clients 502-3 and 502-4 are coupled to the second relay agent 504-2 through a second broadband network 514. The first router 506-1 and the second router 506-2 are coupled to each other via a third network 516. The first relay agent 504-1 communicates with the main server 508 via the first router 506-1 and with the backup server 510 via the first router 506-1 and the second router 506-2. The second relay agent 504-2 communicates with the main server 508 via the first router 506-1 and the second router 506-2 and with the backup server 510 via the second router 506-2. The main server 508 and the backup server 510 are configured to be a pair of failover servers/partners. In a non-limiting embodiment, the system 500 is operated in accordance with the DOCSIS.

In system 500, the relay agents 504-1 and 504-2 route packets/messages communicated between the clients 502 and the servers 508 and 510 in a manner similar to the relay agent 106 depicted in FIG. 1. The main server 508 and the backup server 510 may execute their respective failover logic to communicate with each other, so that the pair of failover servers/partners is in the normal communication mode. In the normal communication mode, the main server 508 is responsive to discovery messages and the backup server 510 is not responsive to discovery messages. New clients obtains leases from and existing clients renews leases with the main server 508, but not the backup server 510. The backup server 510 may take over the responsibility of providing services, e.g., DHCP services, to the clients when it detects that the main server 508 becomes unresponsive.

In one embodiment, the first router 506-1 may be incorrectly configured such that it does not correctly route messages/packets it receives from the main server 508 to an intended client. For example, with reference to FIG. 5, the client 502-4 transmits a discovery message (e.g., DHCP-DISCOVER or SOLICIT) to the second relay agent 504-2, which then forwards the discovery message to the main server 508 via the second router 506-2 and the first router 506-1 and to the backup server 510 via the second router 506-2. Because the backup server 510 is configured to be unresponsive to discovery messages, only the main server 508 is to respond to the discovery message from the client 502-4. Upon receiving the discovery message, the main server 508 transmits to the first router 506-1 an offer message containing an identification of the main server 508. The first router 506-1 is incorrectly configured and forwards the offer message to the first relay agent 504-1 when it should have forwarded the offer message to the second relay agent 504-2. The client 502-4 fails to receive an offer message from the main server 508 or from the backup server 510. As a result, the client 502-4 will continue to send discovery messages.

If this happens, the backup server 510 receives discovery messages from the second relay agent 504-2, but will not receive any request messages (e.g., DHCPREQUEST or REQUEST) from the second relay agent 504-2 because the offer message from the main server 508 is not transmitted to the second relay agent 504-2 due to the incorrect configuration of the first router 506-1. In some embodiments, when (1) a number of discovery messages received by the backup server 510 from the second relay agent 504-1 is equal to or greater than a predetermined number threshold, and (2) a time lapse between the current time and a prior time when the backup server 510 receives from the second relay agent 504-2 a discovery message that caused the PartnerDiscoveryCount to go from 0 to 1 is equal to or greater than a predetermined time threshold, the backup server 510 can execute its failover logic to become responsive to the discovery messages.

The techniques disclosed herein for handling network failures are more effective when both conditions (1) and (2) described above are satisfied. If only condition (1) is used as a trigger for the backup to start responding, an avalanche of requests could prematurely trigger the backup server to become responsive before the main server and clients have a chance to respond to each other. If only condition (2) is used as a trigger for failover, only two discovery request to the main server could prematurely trigger the backup server to become responsive.

In one embodiment, after the backup server 510 receives a message from a relay agent at the current time, the backup server 510 determines whether the message is a discovery message. If the message is not a discovery message, the backup server 510 may terminate processing for the message. If the message is a discovery message, the backup server 510 determines from the discovery message whether an address of the relay agent is logged in the information (e.g., information 400 in FIG. 4) stored for the backup server 510. If the address of the relay agent is not logged in the information, the backup server 510 may generate an entry in the information for the address of the relay agent. If the address of the relay agent is logged in the backup server's information, the backup server 510 determines whether a time lapse between the current time and a prior time when the backup server 510 receives from the relay agent a prior discovery message immediately preceding the current discovery message, is equal to or greater than a predetermined restart time threshold. If the time lapse is equal to or greater than the predetermined restart time threshold, the backup server 510 sets the number of discovery messages sent from the relay agent in the information to zero. If the time lapse is less than the predetermined restart time threshold, the backup server 510 increments the number of discovery messages sent from the relay agent by one and replaces the prior time record in the information for the backup server with the current time. And, if the number of discovery message count is 1, the backup server 510 records the current time as PartnerUnresponsiveStartTime in the information 400, which is deemed a start time for measuring how long the main server 508 has been unresponsive.

In some embodiments, the backup server 510 may receive from the relay agent a service request message (e.g., DHCPREQUEST or REQUEST) selecting the main server 508 at a later time. When this happens, the backup server 510 (1) resets the number of discovery messages received by the backup server 510 from the relay agent to zero and (2)

configures itself to become unresponsive to discovery messages received from the relay agent.

In some embodiments, a pair of failover servers/partners can both be responsive to discovery messages under a load-balancing scheme. That is, each of the servers would be responsive to a subset of clients allocated to it, but not the other subset of clients allocated to its partner. A load-balancing scheme may be performed by hashing the client's identity information and giving each server a portion of the hash values for which to be responsive. Since both servers will generate the same hash, only one of the servers will respond. Each of the failover servers/partners stores its information related to relay agents, such as information 400 (FIG. 4), for acting as a backup server for its partner as described above. Particularly, in addition to responding to the clients allocated to it, a server may monitor whether its partner responds to the discovery messages from clients its partner should have responded to but has failed to do so. Each server can take over the responsibility of its partner when it detects that its partner becomes unresponsive for messages received from a particular relay agent's giaddr/source address.

Figure 6A:
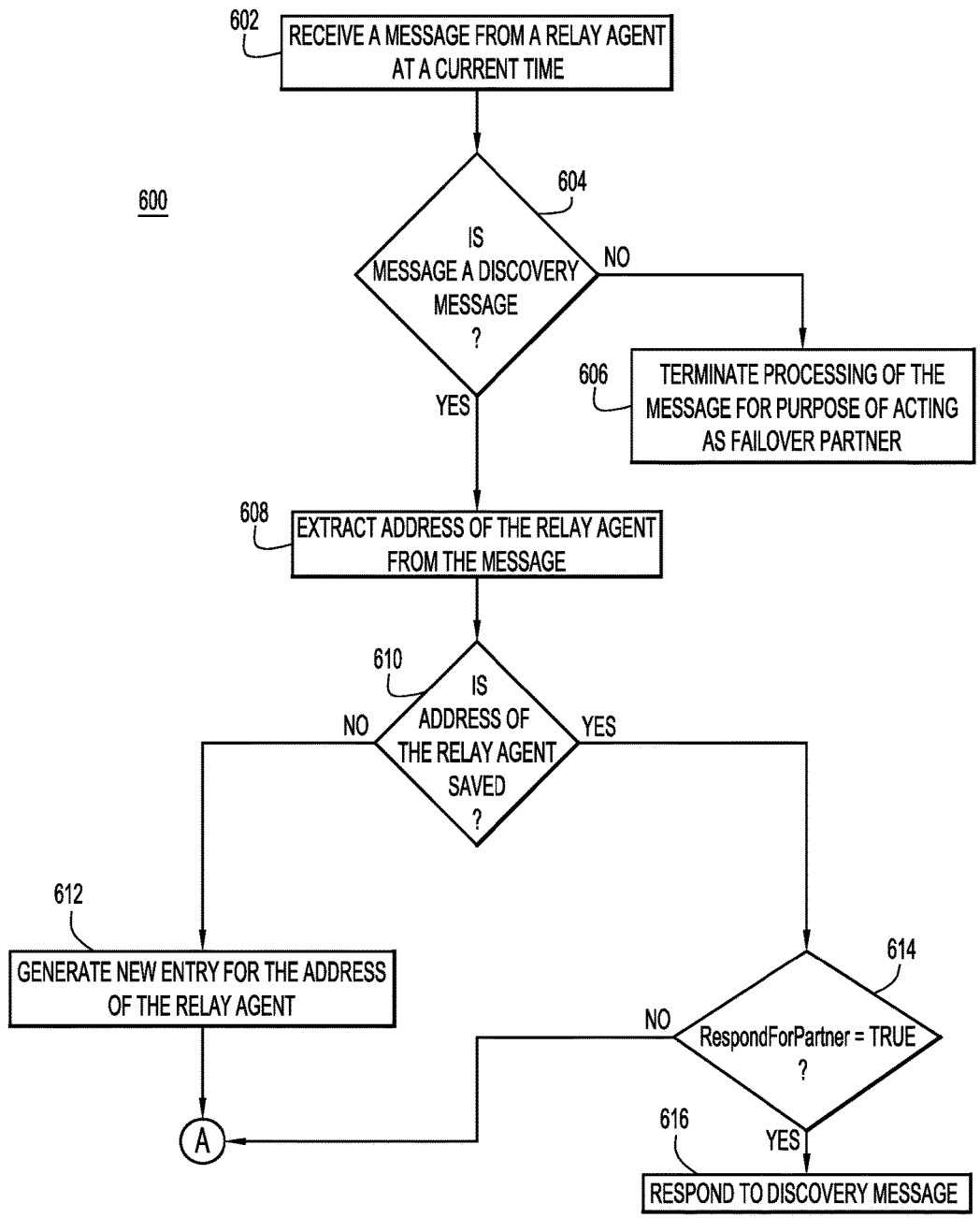
FIGS. 6A and 6B are flow charts depicting a method performed by a server for processing messages received from one or more relay agents, according to an example embodiment.
Figure 6B:
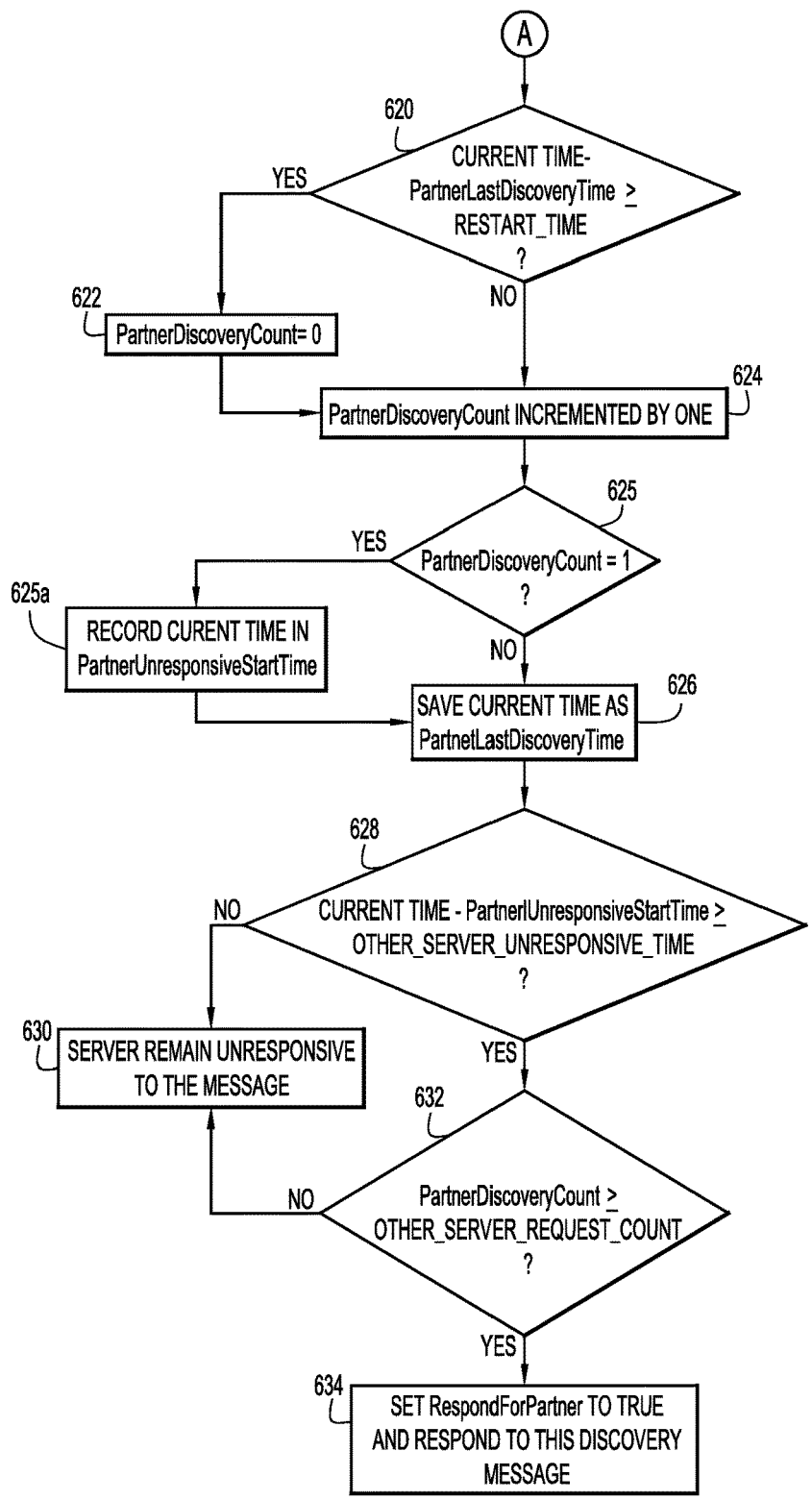

FIGS. 6A and 6B are flow charts depicting a method 600 performed by a server for processing messages received from one or more relay agents, according to an example embodiment. Referring first to FIG. 6A, in 602, the server receives a message from a relay agent at a current time. At 604, the server determines whether the message is a discovery message, e.g., a DHCP discovery message. If the message is not a discovery message (No at 604), at 606 the server terminates processing of the message for purpose of acting as a failover partner for its partner. If the message is a discovery message (Yes at 604), at 608 the server extracts from the message an address of the relay agent. At 610 the server determines whether the address of the relay agent is logged in information (e.g., information 400 in FIG. 4) stored for the server. If the address of the relay agent is not logged in the information (No at 610), at 612 the server generates a new entry for the relay agent to include the address of the relay agent. Thereafter, the server proceeds to execute operations in FIG. 6B. If the address of the relay agent is logged in the information (Yes at 610), at 614 the server determines whether it should respond to the discovery message for its partner according to the setting in the information, i.e., determining whether RespondForPartner is TRUE. If the server determines that it should respond to the discovery message for its partner (Yes at 614), at 616 the server responds to the discovery message. If the server determines that it should not respond to the discovery message for its partner (No at 614), the server also proceeds to execute operations in FIG. 6B.

Reference is now made to FIG. 6B. At 620 the server determines whether a time lapse between the current time and a prior time (PartnerLastDiscoveryTime) when the server receives from the relay agent a discovery message immediately preceding the current discovery message, is equal to or greater than a predetermined restart time threshold (RESTART_TIME). If the time lapse is equal to or greater than the predetermined restart time threshold (Yes at 620), at 622 the server sets a number of discovery messages sent from the relay agent (PartnerDiscoveryCount) in the information to zero. If the time lapse is not equal to or greater than the predetermined restart time threshold (No at 620), at 624 the server increments the number of discovery messages sent from the relay agent by one. At 625, the server determines whether the count for discovery messages (PartnerDiscoveryCount) is one (1). If the count for discovery messages is one (Yes at 625), at 625a the server records the current time in the PartnerUnresponsiveStartTime (FIG. 4). After 625a, the method proceeds to 626. Also if the count for discovery messages is not one (No at 625), at 626, the server further replaces the prior time with the current time in the information stored in the PartnerLastDiscoveryTime for the relay agent. Steps 624 and 626 can be perform in a reverse order or simultaneously. At 628, the server determines whether a time lapse between the current time and a second prior time when the server receives from the relay agent a first discovery message (PartnerUnresponsiveStartTime) is equal to or greater than a predetermined time threshold (OTHER_SERVER_UNRESPONSIVE_TIME). If this time lapse is not equal to or greater than the predetermined time threshold (No at 628), at 630 the server remains unresponsive to the message. If this time lapse is equal to or greater than the predetermined time threshold (Yes at 628), at 632 the server determines whether a number of discovery messages received from the relay agent (PartnerDiscoveryCount) is equal to or greater than a predetermined number threshold (OTHER_SERVER_REQUEST_COUNT). If the number of discovery messages received from the relay agent is not equal to or greater than a predetermined number threshold (No at 632), the server remains unresponsive to the message as at 630. If the number of discovery messages received from the relay agent is equal to or greater than a predetermined number threshold (Yes at 632), at 634 the server sets RespondForPartner to TRUE and configures itself to become responsive to the message. In some embodiments, steps 628 and 632 can be perform in a reverse order or simultaneously.

In some embodiment, in a more general form, a method performed by a first server for handling network failures is provided hereafter. The first server and a second server forms a failover relationship to provide services to a plurality of clients through one or more relay agents, where the second server is configured to respond to discovery messages, and the first server is configured to be unresponsive to the discovery messages and to be responsive to the discovery messages when the second server becomes unresponsive to the discovery messages. The first server receives a first discovery message from a first relay agent among the one or more relay agents at a first time. The first discovery message is originated from a client for both the first server and the second server. The first server determines whether a number of discovery messages received from the first relay agent is equal to or greater than a predetermined number threshold. If the number of discovery messages received from the first relay agent is not equal to or greater than the predetermined number threshold, the first server remains unresponsive to the first discovery message. If the number of discovery messages received from the first relay agent is equal to or greater than the predetermined number threshold, the first server determines whether a time lapse between the first time and a second time is equal to or greater than a predetermined time threshold, where the second time is a time when the first server receives from the first relay agent a first discovery message after the first server receives a first service request selecting the second server. The first discovery message causes the count of discovery messages, PartnerDiscoveryCount, goes from 0 to 1. If the time lapse is not equal to or greater than the predetermined time threshold, the first server remains unresponsive to the first discovery message. If the time lapse is equal to or greater than the predetermined time threshold, the first server configures itself to become responsive to the first discovery message.

Figure 7:
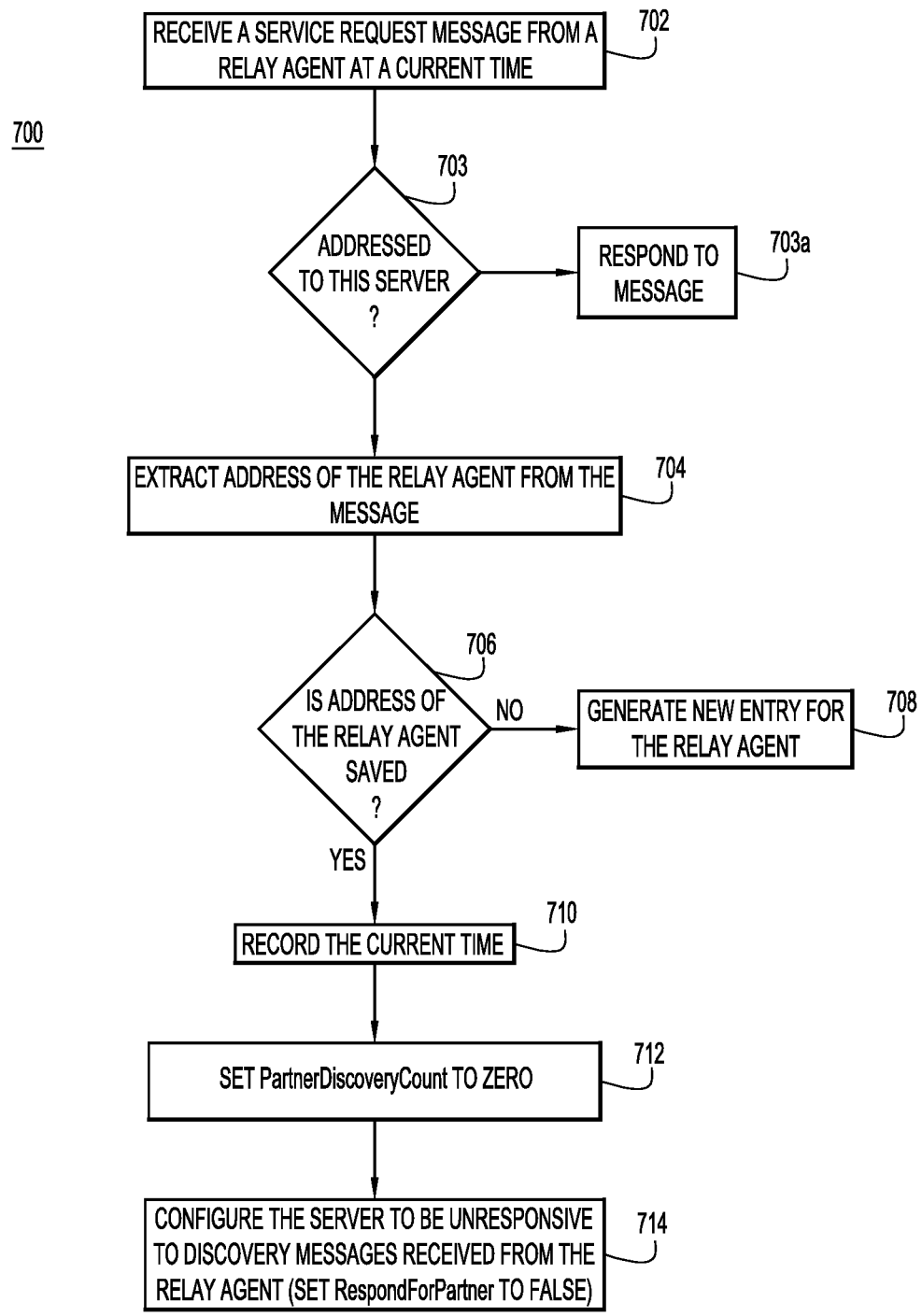
FIG. 7 is a flow chart depicting a method performed by a server for processing messages received from one or more relay agents, according to an example embodiment.

FIG. 7 is a flow chart depicting a method 700 performed by a server for processing messages received from one or more relay agents, according to an example embodiment. At 702, the server receives a service request message (e.g., DHCPREQUEST or REQUEST) from a relay agent at a current time. It then checks whether the client selected this server or another at 703 and if this server, it proceeds to respond to the message at 703a. Otherwise, at 704, the server extracts the address of the relay agent from the received service request message. At 706, the server determines whether the address of the relay agent is logged in the information (e.g., information 400 in FIG. 4) related to relay agents stored for the server. If the address of the relay agent is not logged in the information (No at 706), at 708 the server generates a new entry for the relay agent in the information. If the address of the relay agent is logged in the information (Yes at 706), at 710 the server records the current time in the entry for the relay agent in the information. At 712, the server resets the number of discovery message (PartnerDiscoveryCount) received from the relay agent to zero. At 714, the server is configured to be unresponsive to discovery messages received from the relay agent (sets RespondForPartner to FALSE). It is to be understood that the sequence of steps 710, 712, and 714 can be in any order or performed simultaneously.

Figure 8:
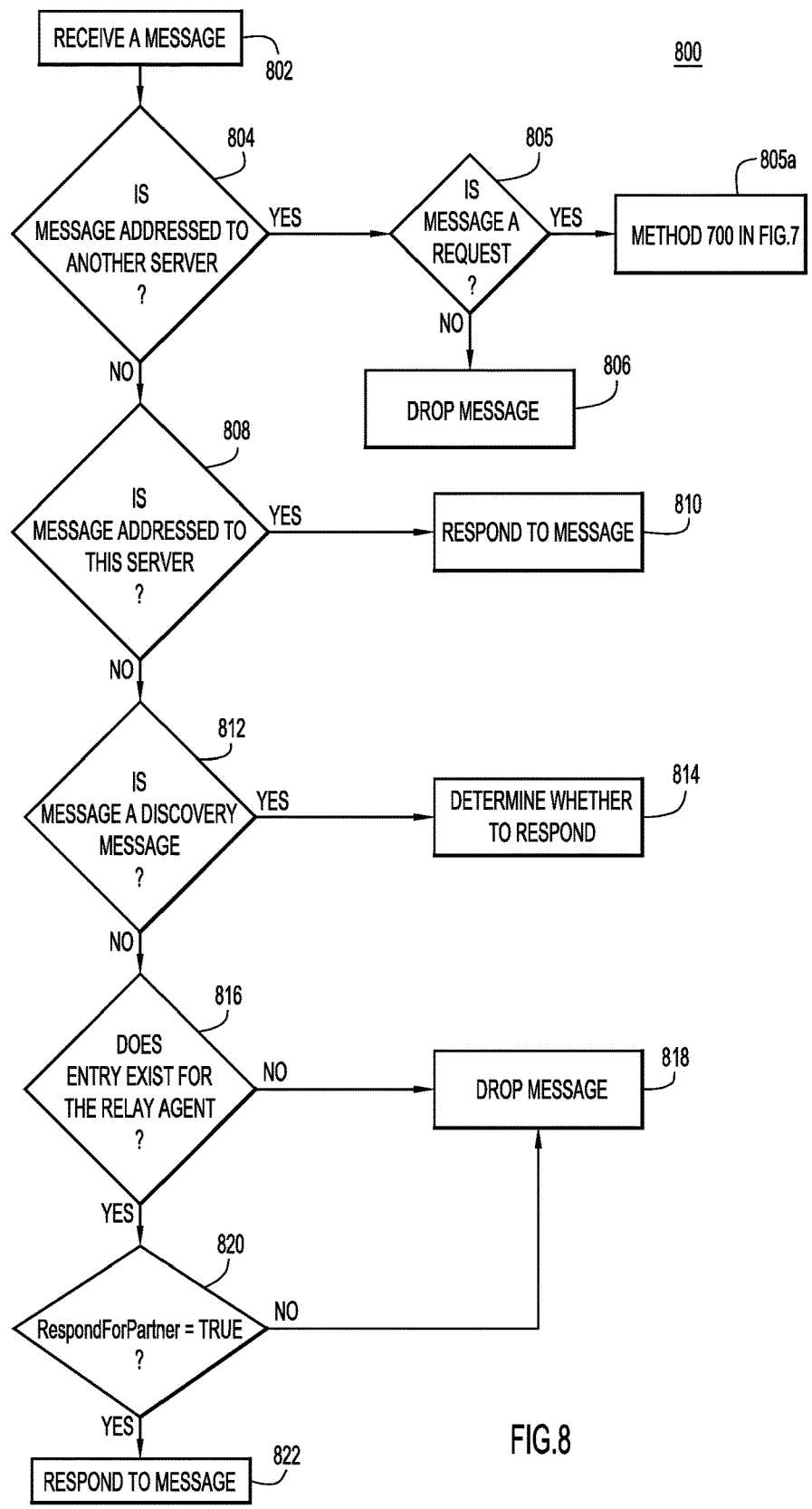
FIG. 8 is a flow chart depicting a method performed by a server for processing for processing messages received from one or more relay agents, according to an example embodiment.

FIG. 8 is a flow chart depicting a method 800 performed by a server for processing messages received from one or more relay agents, according to an example embodiment. At 802, the server receives a message from a relay agent. At 804, the server determines whether the message is explicitly addressed to another server. If so, at 805 the server checks whether this is a Request message. If the message is a Request message, the method 800 proceeds to 805a and performs the processing in FIG. 7. If the message is not a Request message, at 806, the server drops the message. If the message is not addressed to another server (No at 804), at 808 the server determines whether the message is explicitly addressed to itself If so, at 810 the server responds to the message. If the message is not addressed to this server (No at 808), at 812 the server determines whether the message is a discovery message. If the message is a discovery message (Yes at 812), at 814 the server determines whether to respond to the message according to a predetermined logic, such as that depicted in FIGS. 6A, and 6B. If the message is not a discovery message (No at 812), at 816 the server determines whether the server stores an entry for the relay agent. If the server does not store an entry for the relay agent (No at 816), at 818 the server drops the message. If the server stores an entry for the relay agent (Yes at 816), at 820 the server determines whether the entry for the relay agent has RespondForPartner set to TRUE. If RespondForPartner is set to TRUE (Yes at 820), at 822 the server responds to the message. If RespondForPartner is not set to TRUE (No at 820), the server drops the message at 818.

Techniques disclosed herein allow a failover server to provide services to a client when it detects that its failover partner/server is unresponsive, which may be due to a network failure. Each server may track the activity from the relay agent and maintain a table of source addresses (giaddr or IPv6 source address) and related data. In some embodiments, a server may guard against this table of information growing too large to save storage resources. For example, a server may be able to store up to 10000 entries of relay agents. In some embodiments, the number of entries in the table may be configurable. An example to save storage resource may involve dropping a table entry when the PartnerLastDiscoveryTime is equal to or greater than RESTART_TIME, as this indicates that there has been no activity recently and any retained information is likely stale.

In some embodiments, once a backup server becomes responsive for a particular relay agent, a mechanism may be employed so that the backup server does not respond to all future discovery messages because the backup server may never become unresponsive again. This may occur, for example, if the clients always take the now responsive server's DHCPOFFER or ADVERTISE over the other failover partner. In one embodiment, a backup server may use a random number generator to "flip a coin" or determine as to whether the backup server should respond. For example, a backup server may use 50% probability as its guideline to respond to half and not respond to the other half of the discovery messages. In one embodiment, this probability may be another percentage or may be configurable.

In another non-limiting embodiment, once a backup server becomes responsive for a particular relay agent, it can respond to a discovery message after a predetermined time period. For example, before the backup responds to a discovery message, it can wait 500 milliseconds. In some embodiments, the time constraint may be used with the probability scheme described above.

In some embodiments, the backup server may be configured with a lower server preference option values (for DHCPv6), so that the main server is more preferred by the client should both respond.

In still another embodiment, a backup server may use the client's DHCPv4 SECS field or DHCPv6 elapsed time option value to determine whether to respond. If the value is less than a predetermined or configurable number, the backup server does not respond. This may require a client to retry once or more before it is serviced. In some embodiments, the time constraint may be used with the probability scheme described above. For example, the predetermined or configurable number is scaled based on the probability.

In one embodiment, a backup server is configured to report and/or alert when it becomes responsive for requests from a relay agent. This reporting may be made to a log file (syslog), and the alert may be generated via a Simple Network Management Protocol (SNMP) trap or similar mechanism. These reports or alerts may be used to alert a service provider as to potential network issues that need to be investigated and corrected.

Although specific network communications is employed in the embodiments above, the techniques presented herein can be applied to other network topology, and is not limited to a particular portion of the network topology.

In one embodiment, techniques disclosed herein allow a DHCP failover partner that would otherwise not respond to client requests to become responsive when it detects that its partner, which is "up and operating" and supposed to be responsive, is not responding to client requests, e.g., discovery messages, because of a network failure, such as link outage or routing misconfiguration where the partner is not receiving or successfully able to respond to client requests. Therefore, client devices that would otherwise have experienced an outage, will receive services.

In summary, in one aspect, a method for providing services by a pair of servers to a plurality of clients through one or more relay agents is provided. The pair of servers includes a first server and a second server, wherein the second server is configured to respond to discovery messages, and the first server is configured to be unresponsive to the discovery messages and to be responsive to the discovery messages when the second server becomes unresponsive to the discovery messages. The one or more relay agents are configured to relay messages communicated between the plurality of clients and the pair of servers. The method includes: at the first server, receiving a first discovery message from a first relay agent among the one or more relay agents at a first time, the first discovery message having originated from a client for both the first server and the second server; determining whether a number of discovery messages received from the first relay agent is equal to or greater than a predetermined number threshold; determining whether a time lapse between the first time and a second time is equal to or greater than a predetermined time threshold, the second time being a time when the first server receives from the first relay agent a particular discovery message received by the first server after the first server receives a first service request selecting the second server; and configuring the first server to become responsive to the first discovery message when the number of discovery messages from the first relay agent is equal to or greater than the predetermined number threshold and when the time lapse between the first time and the second time is equal to or greater than the predetermined time threshold.

In another aspect, a server is provided, which is part of a failover server pair with a partner server for providing services to a plurality of clients through one or more relay agents. The partner server is configured to respond to discovery messages, and the server is configured to be unresponsive to the discovery messages and to be responsive to the discovery messages when the partner server becomes unresponsive to the discovery messages. The one or more relay agents are configured to relay messages communicated between the plurality of clients and the partner server and the server. The server includes a communication interface that enables network communications; a processor; and a memory to store data and instructions executable by the processor. The processor is configured to execute the instructions to: receive a first discovery message from a first relay agent among the one or more relay agents at a first time, the first discovery message having originated from a client for both the server and the partner server; determine whether a number of discovery messages received from the first relay agent is equal to or greater than a predetermined number threshold; determine whether a time lapse between the first time and a second time is equal to or greater than a predetermined time threshold, the second time being a time when the server receives from the first relay agent a particular discovery message received by the server after the server receives a first service request selecting the partner server; and configure the server to become responsive to the first discovery message when the number of discovery messages from the first relay agent is equal to or greater than the predetermined number threshold and when the time lapse between the first time and the second time is equal to or greater than the predetermined time threshold.

In yet another aspect, a non-transitory computer-readable storage media is provided. The non-transitory computer-readable storage media is encoded with software comprising computer executable instructions which, when executed by a processor of a server of a failover server pair that includes the server and a partner server, cause the processor to communicate with the partner server for providing services to a plurality of clients through one or more relay agents. The partner server is configured to respond to discovery messages, and the server is configured to be unresponsive to the discovery messages and to be responsive to the discovery messages when the partner server becomes unresponsive to the discovery messages. The one or more relay agents are configured to relay messages communicated between the plurality of clients and the server and the partner server. The instructions cause the processor of the server to: receive a first discovery message from a first relay agent among the one or more relay agents at a first time, the first discovery message having originated from a client for both the server and the partner server; determine whether a number of discovery messages received from the first relay agent is equal to or greater than a predetermined number threshold; determine whether a time lapse between the first time and a second time is equal to or greater than a predetermined time threshold, the second time being a time when the server receives from the first relay agent a particular discovery message received by the server after the server receives a first service request selecting the partner server; and configure the server to become responsive to the first discovery message when the number of discovery messages from the first relay agent is equal to or greater than the predetermined number threshold and when the time lapse between the first time and the second time is equal to or greater than the predetermined time threshold.

The above description is intended by way of example only. Various modifications and structural changes may be made therein without departing from the scope of the concepts described herein and within the scope and range of equivalents of the claims.

What is claimed is:

1. A method for providing services by a pair of servers to a plurality of clients through one or more relay agents, the pair of servers including a first server and a second server, wherein the second server is configured to respond to discovery messages, and the first server is configured to be unresponsive to the discovery messages and to be responsive to the discovery messages when the second server becomes unresponsive to the discovery messages, the one or more relay agents being configured to relay messages communicated between the plurality of clients and the pair of servers, the method comprising:
   at the first server, receiving a first discovery message from a first relay agent among the one or more relay agents at a first time, the first discovery message having originated from a client for both the first server and the second server;
   determining whether a number of discovery messages received from the first relay agent is equal to or greater than a predetermined number threshold;
   determining whether a time lapse between the first time and a second time is equal to or greater than a predetermined time threshold, the second time being a time when the first server receives from the first relay agent a particular discovery message received by the first server after the first server receives a first service request selecting the second server; and
   configuring the first server to become responsive to the first discovery message when the number of discovery messages from the first relay agent is equal to or greater than the predetermined number threshold and when the time lapse between the first time and the second time is equal to or greater than the predetermined time threshold.

2. The method of claim 1, further comprising:
   storing information for the first server, the information including an entry for each of the one or more relay agents, wherein an entry for the first relay agent includes:
      an address of the first relay agent;
      the second time when the first server receives, from the first relay agent, the particular discovery message;

a number of discovery messages received by the first server from the first relay agent; and a time when the number of discovery messages is last updated.

3. The method of claim 2, further comprising, at the first server:

receiving a second message from a second relay agent at a third time, the second message being sent for both the first server and the second server;

determining whether the second message is a discovery message;

if the second message is a discovery message, determining from the second message whether an address of the second relay agent is logged in the information stored for the first server; and if the second message is not a discovery message, terminating processing for the second message.

4. The method of claim 3, further comprising:

if the address of the second relay agent is not logged in the information, generating an entry in the information for the address of the second relay agent; and if the address of the second relay agent is logged in the information, determining whether a time lapse between the third time and a fourth time is equal to or greater than a predetermined restart time threshold, the fourth time being a time when the first server receives from the second relay agent a third discovery message immediately preceding the second message.

5. The method of claim 4, further comprising:

if the time lapse between the third time and the fourth time is equal to or greater than the predetermined restart time threshold, setting a number of discovery messages sent from the second relay agent in the information to zero;

if the time lapse between the third time and the fourth time is less than the predetermined restart time threshold, incrementing the number of discovery messages sent from the second relay agent by one and replacing the fourth time with the third time in the information stored by the first server.

6. The method of claim 5, further comprising:

after the number of discovery messages sent from the second relay agent is incremented, determining whether the number of discovery messages sent from the second relay agent is one; and if the number of discovery messages sent from the second relay agent is one, recording the third time in the information for the second relay agent.

7. The method of claim 2, further comprising, at the first server:

receiving a second service request message from the first relay agent at a fifth time, the second service request message selecting the second server;

resetting the number of discovery messages received by the first server from the first relay agent to zero; and configuring the first server to be unresponsive to discovery messages received from the first relay agent.

8. The method of claim 2, further comprising:

when a connection between the first server and the second server is discontinued or re-established, resetting all entries in the information.

9. A server that is part of a failover server pair with a partner server for providing services to a plurality of clients through one or more relay agents, wherein the partner server is configured to respond to discovery messages, and the server is configured to be unresponsive to the discovery messages and to be responsive to the discovery messages when the partner server becomes unresponsive to the discovery messages, the one or more relay agents being configured to relay messages communicated between the plurality of clients and the partner server and the server, the server comprising:

a communication interface that enables network communications;

a processor; and a memory to store data and instructions executable by the processor, wherein the processor is configured to execute the instructions to:

receive a first discovery message from a first relay agent among the one or more relay agents at a first time, the first discovery message having originated from a client for both the server and the partner server;

determine whether a number of discovery messages received from the first relay agent is equal to or greater than a predetermined number threshold;

determine whether a time lapse between the first time and a second time is equal to or greater than a predetermined time threshold, the second time being a time when the server receives from the first relay agent a particular discovery message received by the server after the server receives a first service request selecting the partner server; and configure the server to become responsive to the first discovery message when the number of discovery messages from the first relay agent is equal to or greater than the predetermined number threshold and when the time lapse between the first time and the second time is equal to or greater than the predetermined time threshold.

10. The server of claim 9, wherein the processor is further configured to execute the instructions to:

store information for the server in the memory, the information including an entry for each of the one or more relay agents, wherein an entry for the first relay agent includes:

an address of the first relay agent;

the second time when the server receives, from the first relay agent, the particular discovery message;

a number of discovery messages received by the server from the first relay agent; and a time when the number of discovery messages is last updated.

11. The server of claim 10, wherein the processor is further configured to execute the instructions to:

receive a second message from a second relay agent at a third time, the second message being sent for both the server and the partner server;

determine whether the second message is a discovery message;

if the second message is a discovery message, determine from the second message whether an address of the second relay agent is logged in the information stored for the server; and if the second message is not a discovery message, terminate processing for the second message.

12. The server of claim 11, wherein the processor is further configured to execute the instructions to:

if the address of the second relay agent is not logged in the information, generate an entry in the information for the address of the second relay agent; and if the address of the second relay agent is logged in the information, determine whether a time lapse between the third time and a fourth time is equal to or greater than a predetermined restart time threshold, the fourth time being a time when the server receives from the second relay agent a third discovery message immediately preceding the second message.

13. The server of claim 12, wherein the processor is further configured to execute the instructions to:
if the time lapse between the third time and the fourth time is equal to or greater than the predetermined restart time threshold, set a number of discovery messages sent from the second relay agent in the information to zero;
if the time lapse between the third time and the fourth time is less than the predetermined restart time threshold, increment the number of discovery messages sent from the second relay agent by one and replace the fourth time with the third time in the information stored by the server.

14. The server of claim 13, wherein the processor is further configured to execute the instructions to:
after the number of discovery messages sent from the second relay agent is incremented, determine whether the number of discovery messages sent from the second relay agent is one; and
if the number of discovery messages sent from the second relay agent is one, record the third time in the information for the second relay agent.

15. The server of claim 10, wherein the processor is further configured to execute the instructions to:
receive a second service request message from the first relay agent at a fifth time, the second service request message selecting the partner server;
reset the number of discovery messages received by the server from the first relay agent to zero; and
configure the server to be unresponsive to discovery messages received from the first relay agent.

16. The server of claim 10, wherein the processor is further configured to execute the instructions to:
reset all entries in the information when a connection between the server and the partner server is discontinued or re-established.

17. A non-transitory computer-readable storage media encoded with software comprising computer executable instructions which, when executed by a processor of a server of a failover server pair that includes the server and a partner server, cause the processor to communicate with the partner server for providing services to a plurality of clients through one or more relay agents, wherein the partner server is configured to respond to discovery messages, and the server is configured to be unresponsive to the discovery messages and to be responsive to the discovery messages when the partner server becomes unresponsive to the discovery messages, the one or more relay agents being configured to relay messages communicated between the plurality of clients and the server and the partner server, wherein the instructions cause the processor of the server to:
receive a first discovery message from a first relay agent among the one or more relay agents at a first time, the first discovery message having originated from a client for both the server and the partner server;
determine whether a number of discovery messages received from the first relay agent is equal to or greater than a predetermined number threshold;
determine whether a time lapse between the first time and a second time is equal to or greater than a predetermined time threshold, the second time being a time when the server receives from the first relay agent a particular discovery message received by the server after the server receives a first service request selecting the partner server; and
configure the server to become responsive to the first discovery message when the number of discovery messages from the first relay agent is equal to or greater than the predetermined number threshold and when the time lapse between the first time and the second time is equal to or greater than the predetermined time threshold.

18. The non-transitory computer-readable storage media of claim 17, wherein the instructions cause the processor of the server to:
store information for the server in a memory, the information including an entry for each of the one or more relay agents, wherein an entry for the first relay agent includes:
an address of the first relay agent;
the second time when the server receives, from the first relay agent, the particular discovery message;
a number of discovery messages received by the server from the first relay agent; and
a time when the number of discovery messages is last updated.

19. The non-transitory computer-readable storage media of claim 18, wherein the instructions cause the processor of the server to:
receive a second message from a second relay agent at a third time, the second message being sent for both the server and the partner server;
determine whether the second message is a discovery message;
if the second message is a discovery message, determine from the second message whether an address of the second relay agent is logged in the information stored for the server; and
if the second message is not a discovery message, terminate processing for the second message.

20. The non-transitory computer-readable storage media of claim 19, wherein the instructions cause the processor of the server to:
if the address of the second relay agent is not logged in the information, generate an entry in the information for the address of the second relay agent; and
if the address of the second relay agent is logged in the information, determine whether a time lapse between the third time and a fourth time is equal to or greater than a predetermined restart time threshold, the fourth time being a time when the server receives from the second relay agent a third discovery message immediately preceding the second message.

* * * * *